United States Patent [19]

Inoue et al.

[11] Patent Number: 4,907,218
[45] Date of Patent: Mar. 6, 1990

[54] MULTIPLEX SIGNAL PROCESSING APPARATUS

[75] Inventors: Shuji Inoue, Neyagawa; Yoshio Yasumoto, Nara; Sadashi Kageyama, Hirakata; Hideyo Uwabata, Neyagawa; Yoshio Abe, Ibaraki, all of Japan

[73] Assignee: Matsushita Electric Industrial Co., Ltd., Osaka, Japan

[21] Appl. No.: 248,552

[22] Filed: Sep. 19, 1988

[30] Foreign Application Priority Data

Sep. 18, 1987 [JP] Japan ................. 62-235147
Dec. 23, 1987 [JP] Japan ................. 62-325868
Dec. 23, 1987 [JP] Japan ................. 62-325870
Jun. 1, 1988 [JP] Japan ................. 63-134977

[51] Int. Cl.$^4$ .......................... H04J 9/00; H04J 11/00
[52] U.S. Cl. ........................ 370/20; 375/42; 455/60
[58] Field of Search ............... 370/20, 19, 6; 375/39, 375/42; 358/142; 455/60

[56] References Cited

U.S. PATENT DOCUMENTS

| | | | |
|---|---|---|---|
| 2,787,660 | 4/1957 | Teer | 358/142 |
| 2,795,643 | 6/1957 | Lockhart | 358/16 |
| 3,924,060 | 12/1975 | Bedford | 358/142 |
| 4,051,532 | 9/1977 | Hilbert et al. | 358/142 |
| 4,287,528 | 9/1981 | Levy | 358/142 |
| 4,384,364 | 5/1983 | Henning | 370/20 |

FOREIGN PATENT DOCUMENTS 0086988 4/1988 Japan .................. 7/80

OTHER PUBLICATIONS

Y. Yasumoto et al., "An Extended Definition Television System Using Quadrature Modulation of the Video Carrier with Inverse Nyquist Filter", IEEE Trans. Consumer Electronics, vol. CE-33, pp. 173–180, Aug. 1987.
Pritchard, "US Color Television Fundamentals—a Review", IEEE Trans. Consumer Electron., vol. CE-23, pp. 467–478, No. 1977.

Primary Examiner—Douglas W. Olms
Assistant Examiner—Min Jung
Attorney, Agent, or Firm—Wenderoth, Lind & Ponack

[57] ABSTRACT

In a multiplex signal processing apparatus, in the band of a demodulated signal in which a carrier is amplitude-modulated in a vestigial side band by a main signal, another carrier is superposed which is identical in frequency to the first carrier but different in phase by 90° is amplitude-modulated its double side bands by a multiplex signal which is different from the main signal and which is formed into a vestigial side band signal by a nyquist filter. At least either the frequency or polarity of the multiplex signal is inverted on the transmission side by a multiplier, an oscillator and a filter. At least either the frequency or polarity of the multiplex signal is inverted on the reception side by a multiplier, an oscillator and a filter. The reception side has a crosstalk reduction filter for removing crosstalk from the main signal to the multiplex signal.

3 Claims, 13 Drawing Sheets

MULTIPLEX SIGNAL PROCESSING APPARATUS

BACKGROUND OF THE INVENTION

1. Field of the Invention

This invention relates to an apparatus for multiplexing signals on other amplitude-modulated signals.

2. Prior Art

Considering the transmission systems, for example, used for television broadcasting, more than twenty five years have passed since the color television broadcasting using the conventional National Television System Committee (NTSC) method started in 1960 in Japan. In this period, a variety of novel television systems were proposed in response to requests for a high definition image and the enhancement of the performance of television receivers. In addition, the programs of broadcasting have been changing from mere studio programs and live programs to those with high picture quality and realistic feeling such as cinema-size movies.

The conventional broadcasting operates on specifications such as 525 scanning lines, 2:1 interlace scanning, 4.2 MHz horizontal bandwidth of the luminance signal and 4:3 aspect ratio (refer, for example, to Pritchard, "US Color Television Fundamentals—A Review", IEEE Trans. Consumer Electron., vol. CE-23, pp.467–478, No. 1977). As described above, the present television broadcasting is restricted in its signal band by the standard, and hence it is difficult to add other mass information. In view of such a background, we proposed a television signal configuration method capable of multiplexing mass information in a specific band, while keeping compatibility with the conventional television system. (See Y. Yasumoto et al. "An Extended Definition Television System Using Quadrature Modulation of the Video Carrier with Inverse Nyquist Filter", IEEE Trans. Consumer Electronics, Vol. CE-33, pp. 173–180, Aug. 1987 and U.S. Application No. 070804 filed July 7, 1987).

Proposed was a system of amplitude-modulating, in the vestigial side band, a carrier $P_2$, which is a multiple signal different from a main signal, that is, the amplitude-modulated television signal of the vestigial side band in the conventional television system, and has the identical frequency as that of a video carrier $P_1$ and a phase differing by $+90°$ or $-90°$ from that of the video carrier $P_1$, so as to remove the carrier $P_2$ in the blanking period. This modulated signal is band limited by a filter having symmetrical characteristics with respect to the video carrier as compared to that of the video intermediate frequency filter in the conventional television receivers. This signal is added to the vestigial side band amplitude-modulated television signal, and the signals are then multiplexed. The television signal processing method on the receiver side of the television signal combined in the above way is explained below. In the conventional television receiver, the multiplex signal component forms double side bands. Accordingly, impairment by the multiplex signal of the conventional television receiver operation which executes a video signal synchronous detection does not occur theoretically.

A multiplex signal demodulation method in the receiver of the television signal combined in the above method is described next. The signal in the video intermediate frequency band which is an output of the tuner is band limited by a filter so that the video base band signal should form double side bands. When this band-limited signal is synchronously detected by a regenerated carrier of the multiplex signals, that is, a carrier $I_2$ having an identical frequency to that of a video carrier $I_1$ and differing in phase by $+90°$ or $-90°$ from that of the video carrier $I_1$, only the multiplex signal components can be demodulated without any quadrature distortion. In the above publication of IEEE and in U.S. Application Ser. No. 175409 filed on Mar. 28, 1988, a multiplex signal processing apparatus was proposed which can transmit the television signals including image information with an aspect ratio of more than 4:3 by classifying the region whose aspect ratio is 4:3 from among the images having an aspect ratio of not less than 4:3 as main signals and the remaining regions as multiplex signals.

These proposals, however, have problems left unsolved from a viewpoint of impairment of the conventional television receivers. In particular, in the television receivers having a detection circuit using pseudo-synchronous detection or envelope detection, impairment to a certain extent is left in comparison with the television receivers having a detection circuit owing to the synchronous detection. It is moreover impossible to extend the transmission band considering the effective use of radio wave resources.

SUMMARY OF THE INVENTION

It is a primary object of this invention to present a multiplex signal processing apparatus capable of multiplexing mass information in the specific band while keeping compatibility with the conventional television system, wherein impairment caused by multiplex signals on the conventional television receivers can be reduced and the crosstalk from the main signals to the multiplex signals can be suppressed.

To achieve the above object of the present invention, a transmission apparatus comprises a means for modulating a first carrier by a main signal, a means for inverting at least either a frequency or polarity of a multiplex signal, and means for modulating a second carrier whose phase is different by 90° from that of the first carrier by an output from the inverting means. A receiving apparatus comprises a first synchronous detection means for obtaining the main signal by synchronously detecting a in-phase component of the carrier, a second synchronous detection means for obtaining the multiplex signal by synchronously detecting a quadrature component of the carrier, a filter for removing crosstalk from the main signal from the output of the second synchronous detection means, and a means for inverting at least either a frequency or polarity of the output from the filter.

When configurated in the above way, a television signal capable of multiplexing other information in the specific band of the present television broadcasting can be generated, and hence not only pictures of the conventional television broadcasting but also multiplexed information can be obtained by exclusive receivers. By the existing television receivers, moreover, the pictures of the conventional television broadcasting can be received without being impaired by the multiplex signals. At present, a large number of television receivers equipped with a tuner having a pseudo-synchronous detection circuit and an envelope detection circuit are widely used, and hence the reduction of the impairment caused by multiplex signals by this invention exerts great effects. Since the multiplexed signals can be taken out by exclusive receivers without quadrature distortion, excellent effects can be obtained also from a viewpoint of effective use of radio wave resources.

BRIEF DESCRIPTION OF THE DRAWINGS

FIGS. 11($a$)–11($c$) are spectrum views showing the frequency inversion of the multiplex signal, FIGS. 12($a$)–12($c$) are spectrum views showing a processing method of the multiplex signal processing apparatus on the transmission side; and FIGS. 13($a$)–13($b$) are spectrum views showing the processing method of the multiplex signal processing apparatus on the reception side.

DESCRIPTION OF THE PREFERRED EMBODIMENTS

Figure 1:
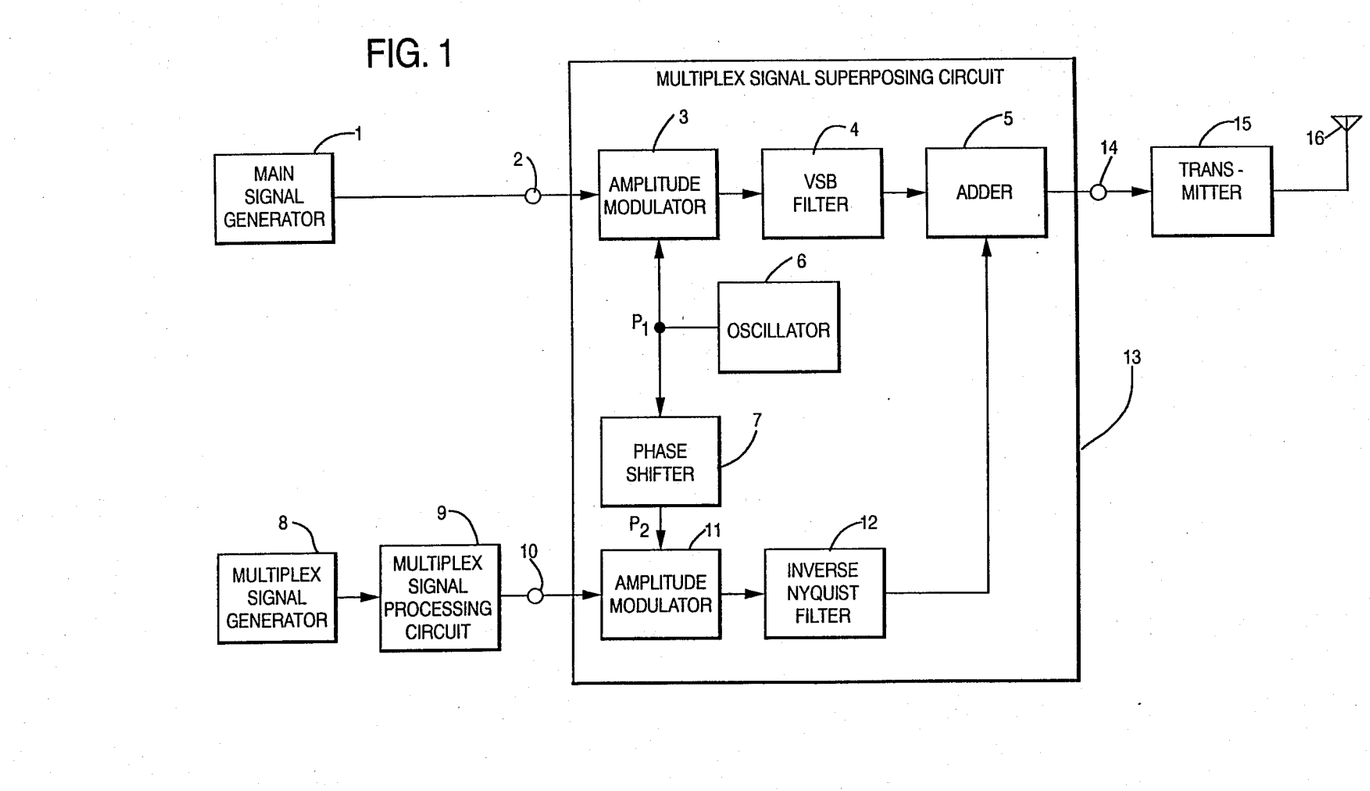
FIG. 1 is a block diagram showing a multiplex signal processing apparatus on the transmission side.
Figure 12A:
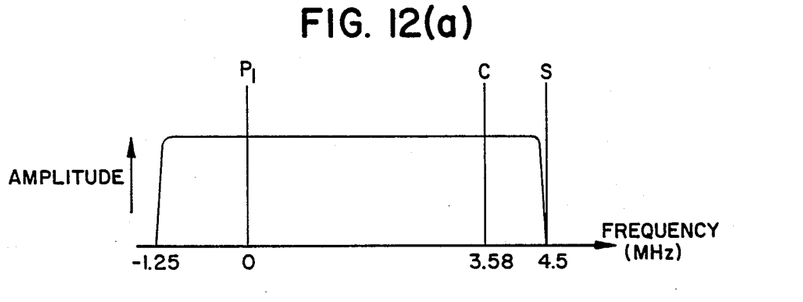
Figure 12B:
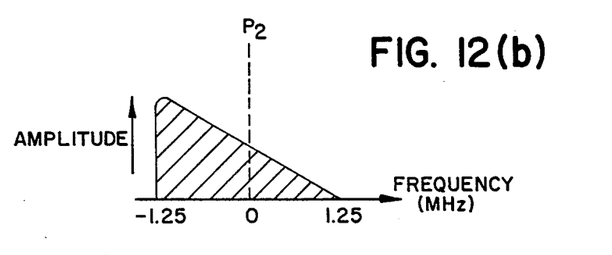
Figure 12C:
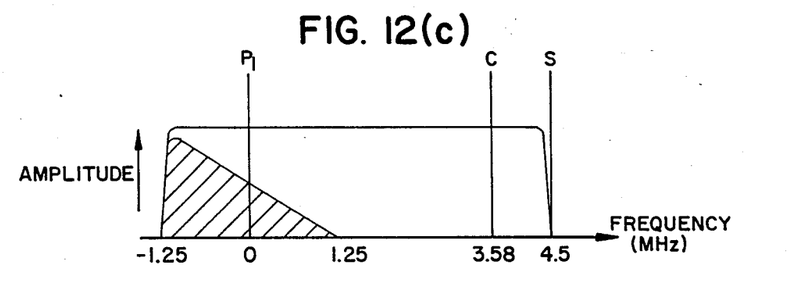

FIG. 1 is a block diagram showing a multiplex signal processing apparatus on the transmission side, in which numeral 1 denotes a main signal generator; element 2 is an input terminal of the main signal; element 3 is an amplitude modulator; element 4 is a VSB filter; element 5 is an adder; element 6 is an oscillator; element 7 is a phase shifter; element 8 is a multiplex signal generator; element 9 is a multiplex signal processing circuit; element 10 is an input terminal of multiplex signal; element 11 is an amplitude modulator; element 12 is an inverse nyquist filter; element 14 is acomoosite signal output terminal; element 15 is a transmitter and element 16 is an antenna. Numeral 13 denotes a multiplex signal superposing circuit combining the amplitude modulator, inverse nyquist filter and adder. A carrier $P_1$ obtained from the oscillator 6 is amplitude-modulated by a main signal, for example, a video base band signal generated by the main signal generator 1 by means of the amplitude modulator 3. The obtained modulated signal is band limited by the VSB filter 4 to be in a vestigial side band, and then fed to the adder 5. The VSB filter 4 is a filter to transform double side bands into a vestigial side band. An example of the spectrum of a vestigial side band amplitude-modulated modified television signal in the NTSC television system is shown in FIG. 12($a$). This is a case that the lower side band of a video carrier $P_1$ is a vestigial side band. Any signal will do as long as it is subjected to the vestigial side band amplitude modulation, and therefore the system may not be limited to the NTSC television system alone. A carrier $P_2$ is formed by shifting the phase of the carrier $P_1$ obtained by the oscillator 6 by $+90°$ or $-90°$ using the phase shifter 7. The carrier $P_2$ is subjected to the double side band amplitude modulation by means of the amplitude modulator 11 by a signal obtained by inverting the frequency and the polarity of the multiplex signal generated by the multiplex signal generator 8 in the multiplex signal processing circuit 9, and more preferably, subjected to the carrier suppression double side band amplitude modulation in the blanking period. Here, the double side band amplitude modification may always be replaced by the carrier suppression double band amplitude modulation. The modulated signal is band limited by the inverse nyquist filter 12 and fed to the adder 5. The amplitude-frequency characteristics of the inverse nyquist filter 12 are symmetric with to the amplitude-frequency characteristics right before the video detection of the receiver in regard to the video carrier. FIG. 12($b$) is an example of amplitude-modulated signal formed by vestigial side band amplitude modulation from the carrier $P_2$ which is a multiplex signal having an identical frequency to that of the video carrier $P_1$ and a phase differing from that of the video carrier $P_1$ by 90°. An output of the adder 5 is a composite signal. That is, a multiplex signal is superposed on a video base band signal to form a composite signal. A spectrum of a composite signal is shown in FIG. 12($c$). The composite signal is transmitted from the transmitter 15 and antenna 16, but the transmission line is not limited to the radio system alone. In the above case, the composite signal is formed by adding the outputs of the inverse nyquist filter 12 and the VSB filter 4, but it is also possible to add the output of the amplitude modulator 3 and that of the inverse nyquist filter 12 and enter the sum in the VSB filter 4 so as to form a composite signal.

Figure 2:
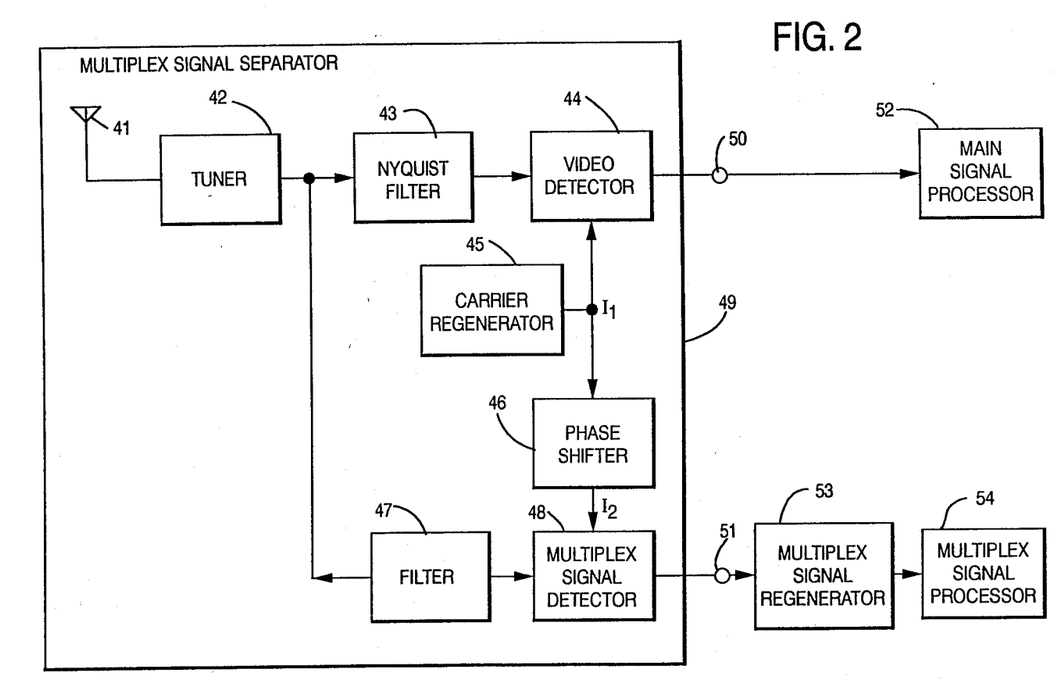
FIG. 2 is a block diagram showing the multiplex signal processing apparatus on the reception side.
Figure 13A:
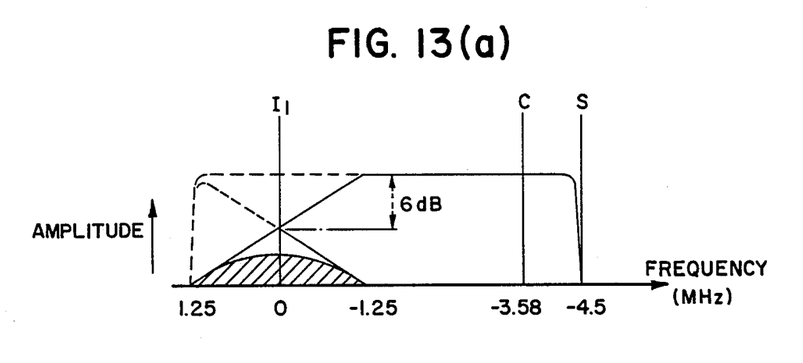
Figure 13B:
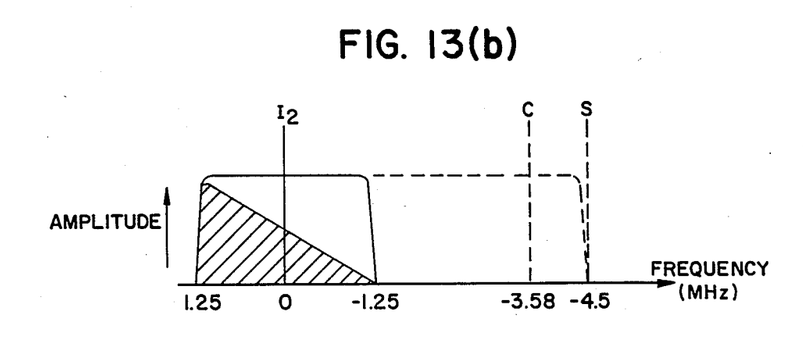

FIG. 2 is a block diagram showing the multiplex signal processing apparatus on the reception side related to an embodiment of the present invention, wherein numeral 41 denotes an antenna; element 42 is a tuner; element 43 is a video intermediate frequency filter; element 44 is a video detector; element 45 is a carrier regenerator; element 46 is a phase shifter; element 47 is a filter; element 48 is a multiplex signal detector; element 50 is an output terminal of the main signal; element 51 is an output terminal of the multiplex signal; element 52 is a main signal processor; element 53 is a multiplex signal regenerator, and element 54 is a multiplex signal processor. Here, element 49 is a multiplex signal separator for separating the main signal and the multiplex signal. A signal sent out from the transmission side is received by the antenna 41, frequency-converted to the intermediate frequency band by the tuner 42, and band-limited by the nyquist filter 43. The band-limited signal is formed into a signal shown in FIG. 13($a$) in which the multiplex signal component shown by the shaded area is converted into double side band components. The band-limited signal is fed to the video detector 44 and the carrier regenerator 45. In the carrier regenerator 45, the carrier $I_l$ for synchronous detection is regenerated. The band-limited signal is detected by the video detector 44 as a main signal, that is, a video base band signal. The main signal is converted, for example, to RGB signals by the main signal processor 52 and displayed on a screen. The output of the tuner 42 is band-limited by the filter 47 so that the main signal is a double side band signal as shown in FIG. 13($b$). The band-limited signal is synchronously detected by the multiplex signal detector 48 with a carrier $I_2$ formed by shifting the phase by 90° by using the phase shifter 46 from the carrier $I_1$ obtained by the carrier regenerator 45, that is, a carrier $I_2$ in phase with the carrier for multiplex signal modulation used on the transmission side. In the multiplex output is transmitted to. In the multiplex signal regenerator 53, the multiplex signal discards the crosstalk from the main signal and is subjected to the frequency inversion and polarity inversion so as to be a resultant multiplex signal. The resultant multiplex signal is subjected to a processing by the multiplex signal processor 54 which is reversed with respect to the processing by the multiplex signal generator on the transmission side.

Figure 3:
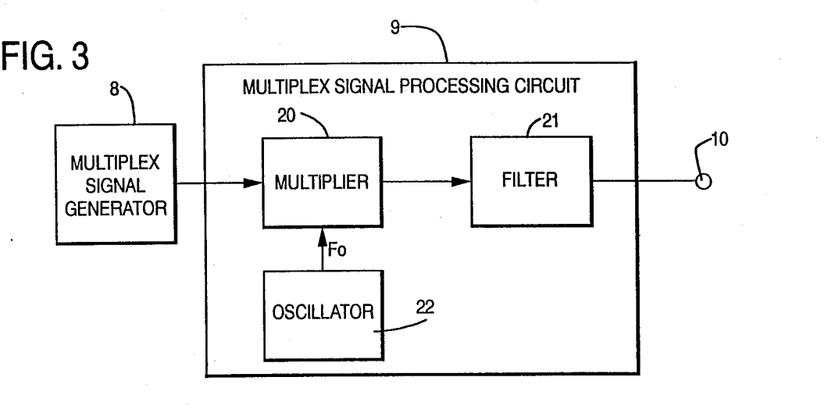
FIG. 3, FIG. 5, FIG. 7 and FIG. 9 are detailed block diagrams of the multiplex signal processing circuits on the transmission side.
Figure 11A:
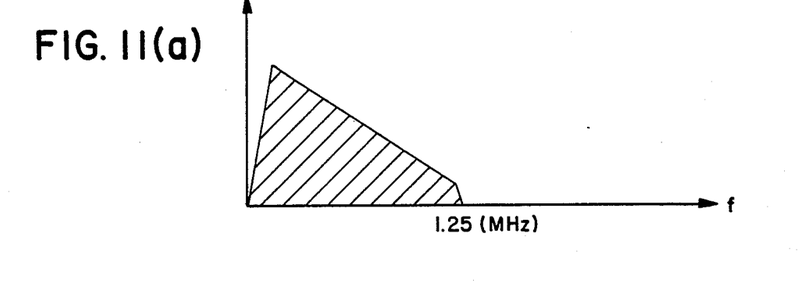
Figure 11B:
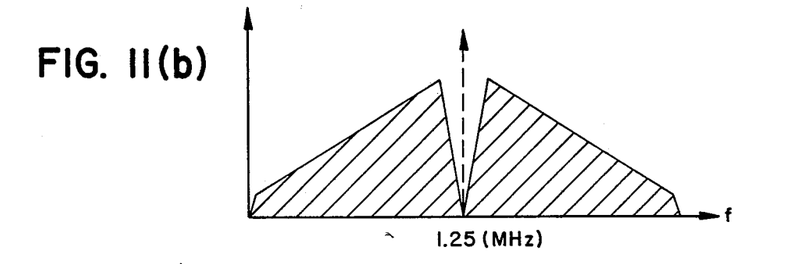
Figure 11C:
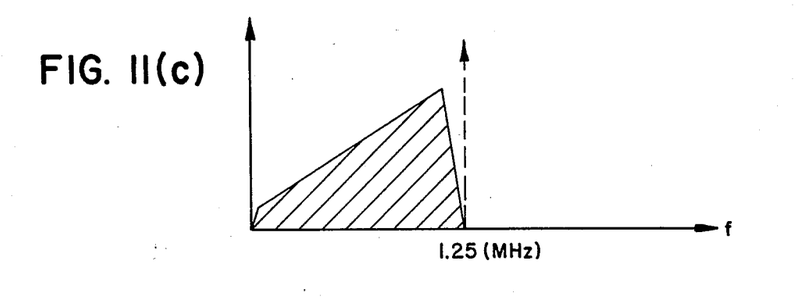

FIG. 3 is a block diagram showing, in detail, a multiplex signal processing circuit of the multiplex signal processing apparatus on the transmission side shown in FIG. 1, in which numeral 20 denotes a multiplier; element 21 is a filter and element 22 is an oscillator. The multiplex signal delivered from the multiplex signal generator 8 is multiplied by a signal $F_0$ generated by the oscillator 22 in the multiplier 20. Assuming the multiplex signal to be a signal with a band of 1.25 MHz as shown in in FIG. 11(a), and if 1.25 MHz is, for example, selected as the frequency of the signal $F_0$ generated by the oscillator 22, it follows that the output of the multiplier 20 is distributed from 0 MHz to 2.5 MHz centered on 1.25 MHz as shown in FIG. 11(b). The output of this multiplier 20 is deprived of unnecessary frequency components by a band-limiting process using the filter 21. That is, when a low-pass filter having its cut-off frequency of 1.25 MHz is employed as the filter 21, the output of the filter 21 results in a multiplex signal which is inverted on the frequency axis as shown in FIG. 11(c). In this way, the frequency inversion of the multiplex signal causes a low frequency component with a relatively strong power to be transferred to a higher frequency zone and also causes the impairment of the conventional receivers to be reduced. In addition, when the phase of the signal $F_0$ generated by the oscillator 22 is inverted, for example, in every horizontal scanning period, or in every field, or in every frame, the polarity of the multiplex signal can be inverted. Otherwise, it is possible to invert the polarity of the multiplex signal by inverting the phase-shifting direction in the phase-shifter 7 in the multiplex signal superposing circuit 13 shown in FIG. 1, for example, in every horizontal scanning period, field or frame. As described above, the impairment of the conventional television receivers can be reduced by inverting the polarity of the multiplex signal. In addition, the crosstalk from the main signal to the multiplex signal can be suppressed by a configuration of a crosstalk reduction filter on the reception side described below.

Figure 4:
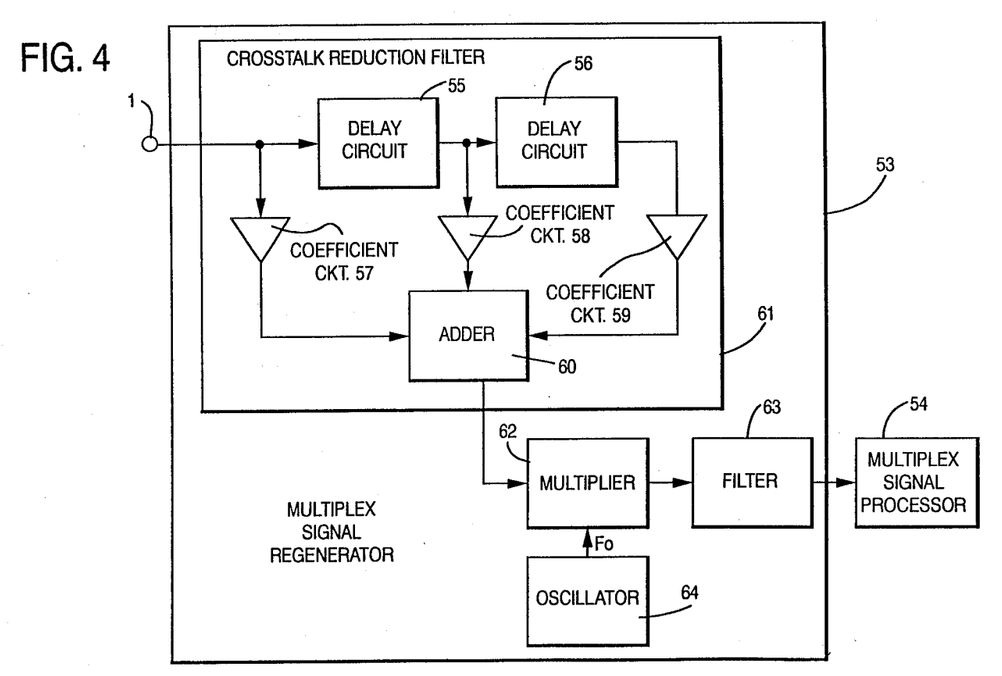
FIG. 4, FIG. 6, FIG. 8 and FIG. 10 are detailed block diagrams of the multiplex signal regenerators on the reception side.

FIG. 4 is a block diagram showing, in detail, the multiplex signal regenerator in the multiplex signal processing apparatus on the reception side shown in FIG. 2, wherein numerals 55 and 56 denote delay circuits; elements 57 . . . 58 and 59 are coefficient circuits; element 60 is an adder; element 62 is a multiplier; element 63 is a filter and element 64 is an oscillator. Here, numeral 61 denotes a crosstalk reduction filter combining the circuits composed of the delay circuits, coefficient circuits and adder. The multiplex signal entered from the terminal 51 of the multiplex signal separator 51 is fed to a cascade connection of the delay circuits 55 and 56. The multiplex signals at the input/output terminals of the delay circuits are weighted by the coefficient circuits 57, 58 and 59 respectively, and they are summed up by the adder 60. The delay time of the delay circuits 55 and 56 depends on the polarity inversion period of the multiplex signal on the transmission side. For example, in the case of inverting the polarity of multiplex signal on the transmission side during every horizontal scanning period, the delay time is set equal to the horizontal scanning period. The coefficient circuits 57, 58 and 59 multiply the input signals by, for example, $-\frac{1}{4}$, $\frac{1}{2}$ and $-\frac{1}{4}$ respectively and deliver the results. The polarity inversion of the multiplex signal on the transmission side causes the multiplex signal and the crosstalk component from the main signal, which are obtained at the output terminal 51 of the multiplex signal separator 49 (FIG. 2) on the reception side, to be in a relationship of frequency interleaving. By making use of this relationship, the crosstalk from the main signal to the multiplex signal can be suppressed in the configuration stated above. The output of the crosstalk reduction filter 61 is multiplied by the multiplier 62 by the signal $F_0$ generated by the oscillator 64. The output of the multiplier 62 is rid of unnecessary frequency components by band-limiting by the filter 63. In other words, the processing on the multiplex signal by the multiplier 62, filter 63 and oscillator 64 is equal to that on the transmission side, that is, in the multiplex signal processing circuit 9. That is, by operating the processing of frequency inversion and polarity inversion on the reception side again, the multiplex signal generated by the transmission side multiplex signal generator 8 (FIG. 3) is obtained. Or it is possible to invert the polarity of multiplex signal by inverting the phase shifting direction of the phase shifter 46 in the multiplex signal separator 49 shown in FIG. 2, for example, during every horizontal scanning period, field or frame. In this case, however, the coefficient circuits 57, 58 and 59 deliver outputs by multiplying the input signal by $\frac{1}{4}$, $\frac{1}{2}$ and $\frac{1}{4}$ respectively. That is, the crosstalk reduction filter 61 may be in any configuration other than the above one as far as the configuration suits the signal to be fed. Here, the signal $F_0$ generated by the reception side oscillator 64 should have an identical frequency and phase to that of the signal $F_0$ generated by the transmission side oscillator 22 (FIG. 3). For that purpose, it is better to send out a signal for regenerating the signal $F_0$ on the reception side by using a vertical blanking period.

Figure 5:
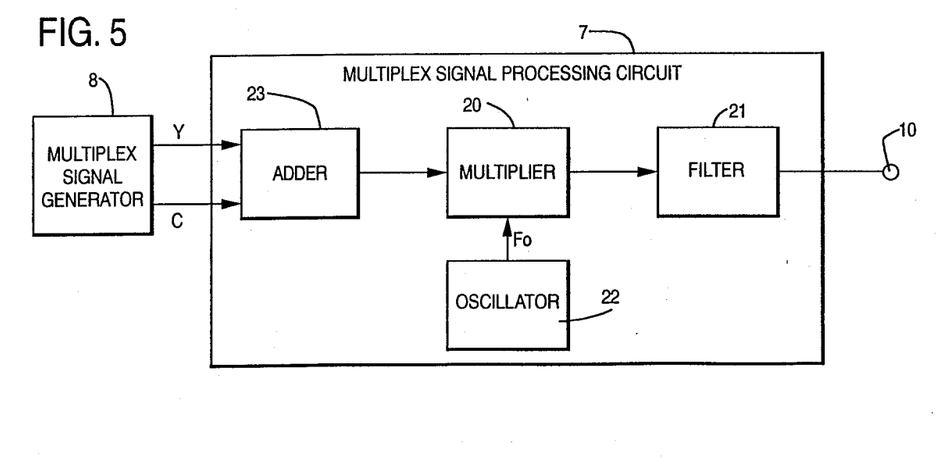

FIG. 5 is a block diagram showing, in detail, the multiplex signal processing circuit for delivering a luminance signal Y and a chrominance signal C from the multiplex signal generator on the transmission side shown in FIG. 1 wherein numeral 23 denotes an adder. The luminance signal Y and chrominance signal C from the multiplex signal generator 8 are summed up by the adder 23 and fed to the multiplier 20. The processing in the multiplier 20, filter 21 and oscillator 22 is the same as that in the multiplex signal processing circuit 9 shown in FIG. 3.

Figure 6:
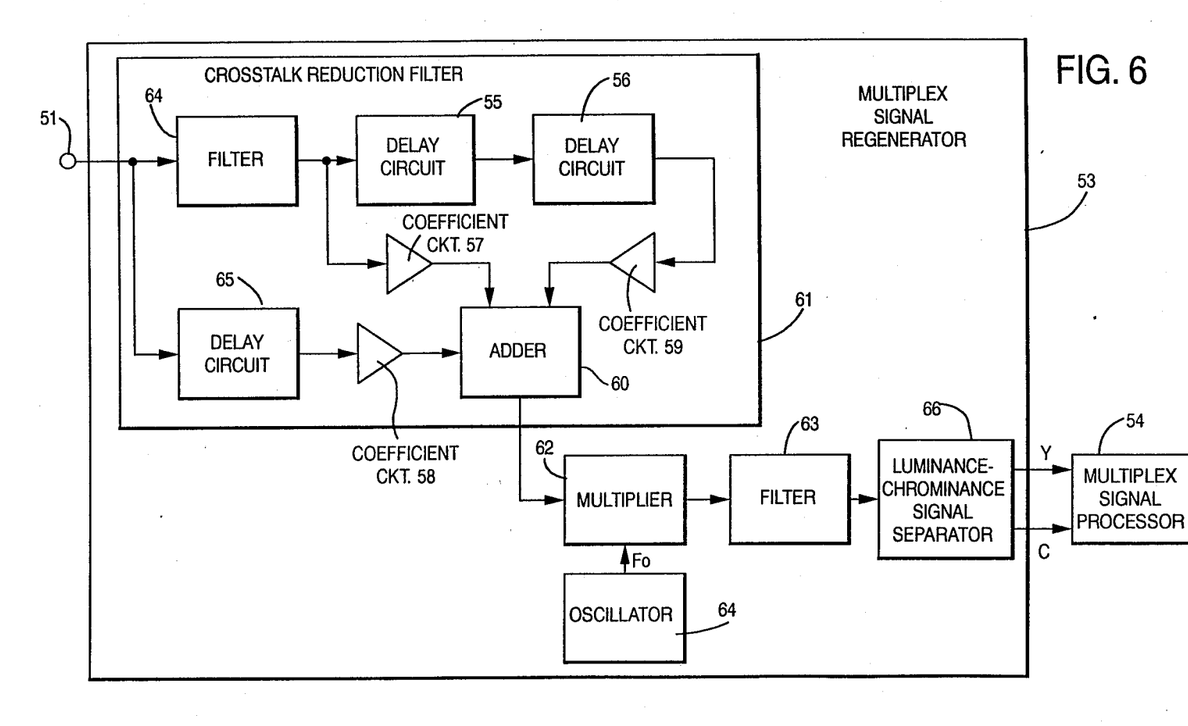

FIG. 6 is a block diagram showing, in detail, the multiplex signal regenerator on the reception side corresponding to the multiplex signal processing circuit on the transmission side shown in FIG. 5, in which numeral 64 denotes a filter; element 65 is a delay circuit and element 66 is a luminance-chrominance signal separator. Since the multiplex signal entered from the terminal 51 is formed by superposing the luminance signal on the chrominance signal on the frequency axis, only the component having no overlapping on the frequency axis is entered in the cascade connection of the delay circuits 55 and 56 by means of the filter 64. The multiplex signal fed from the terminal 51 is also entered to the delay circuit 65. The multiplex signals at the input/output terminals of delay circuits 55, 56 and 65 are weighted by the coefficient circuits 57, 58 and 59 respectively, and they are summed up by the adder 60. The delay time of the delay circuits 55, 56 and 57 depends on the polarity inversion period of the multiplex signal on the transmission side. For example, in the case of inverting the polarity of multiplex signal on the transmission side in every horizontal scanning period, the delay time is set to be the horizontal scanning period. The coefficient circuits 57, 58 and 59 multiply the input signal, for example, by $-\frac{1}{4}$, $\frac{1}{2}$ and $-\frac{1}{4}$ respectively and deliver the results. As constructed in the above configuration, the crosstalk from the main signal to the multiplex signal on the components having no overlapping part between the luminance signal and the chrominance signal on the frequency axis can be suppressed. The output of the crosstalk reduction filter 61 is entered in the multiplier 62. The processing in the multiplier 62, filter 63 and oscillator 64 is the same as that in the multiplier 62, filter 63 and oscillator 64 in FIG. 4. The output of the filter 63 is separated into the luminance signal Y and chrominance signal C by the luminance-chrominance signal separator 66 and sent to the multiplex signal processor 54. The crosstalk, meanwhile from the main signal to the multiplex signal on the components where the luminance signal overlaps the chrominance signal on the frequency axis is contained in the chrominance signal C which is the output from the luminance-chrominance signal separator 66. Since the crosstalk component contained in the chrominance signal C is transmitted by inverting the polarity of the multiplex signal, the impairment is lessened because the component becomes a complementary color during every polarity inversion period.

Figure 7:
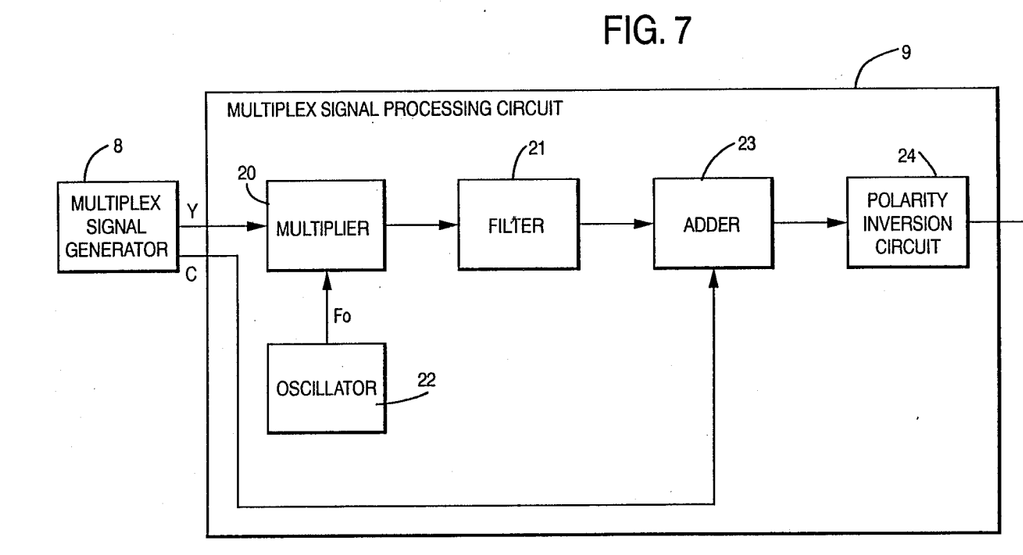

FIG. 7 is a block diagram showing, in detail, the multiplex signal processing circuit for inverting the frequency of only the luminance signal Y of the luminance signal Y and chrominance signal C delivered from the transmission side multiplex signal generator shown in FIG. 1, in which numeral 24 denotes a polarity inversion circuit. Of the luminance signal Y and chrominance signal C delivered from the multiplex signal generator 8, the luminance signal Y is entered in the multiplier 20. The processing in the multiplier 20, filter 21 and oscillator 22 is the same as that in the multiplex signal processing circuit 9 shown in FIG. 3. Here, the frequency inversion only is executed and the polarity inversion is not performed. The output of the filter 21 is added to the chrominance signal C delivered from the multiplex signal generator 8 by the adder 23. The output with respect to the adder 23 is inverted of its polarity by the polarity inversion circuit 24 during every horizontal scanning period, field or frame. For example, the polarity inversion circuit 24 can be realized by a digital circuit by taking a 2's complement. Otherwise, when the polarity of the multiplex signal is inverted by inverting the phase-shifting direction of the circuit 13 shown during FIG. 1 in every horizontal scanning period, field or frame, the polarity inversion circuit 24 is unnecessary. The multiplex signal processed in the above configuration is delivered to the terminal 10.

Figure 8:
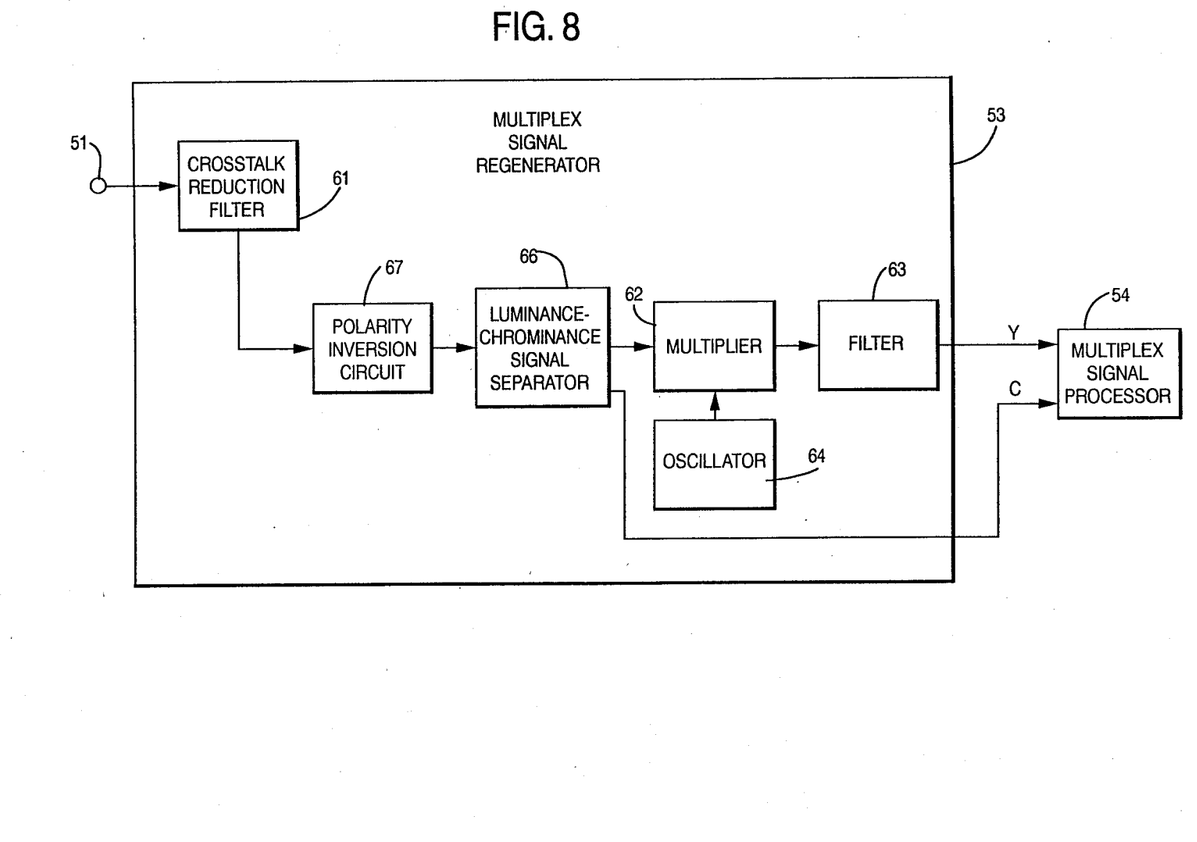

FIG. 8 is a block diagram showing, in detail, the multiplex signal regenerator on the reception side corresponding to the multiplex processing circuit on the transmission side shown in FIG. 7, in which numeral 67 denotes a polarity inversion circuit. The multiplex signal fed from the terminal 51 is rid of the crosstalk by the crosstalk reduction filter 61 in the same configuration as that shown in FIG. 6. The processing performed in the polarity inversion circuit 67 is the same as that in the polarity inversion circuit 24 on the transmission side explained in FIG. 7. That is, a multiplex signal similar to that before transmission side polarity inversion can be obtained by executing the transmission side frequency inversion and polarity inversion again on the reception side. Or if the polarity of the multiplex signal is inverted by inverting the phase shifting direction of the phase shifter 46 in the multiplex signal separator 49 shown in FIG. 2, for example, during every horizontal scanning period, field or frame, the polarity inversion circuit 67 is unnecessary. Here, the crosstalk reduction filter 61 is supposed to be in a configuration suitable for the multiplex signal input as described above. The output of the polarity inversion circuit 67 is separated into a luminance signal Y and a chrominance signal C by the luminance-chrominance signal separator 66. Of the two, the luminance signal Y is fed in the multiplier 62. The processing in the multiplier 62, filter 63 and oscillator 64 is the same as that in the multiplier 62, filter 63 and oscillator 64 in FIG. 4. The luminance signal Y which is an output of the filter 63 and the chrominance signal C which is an output of the luminance-chrominance signal separator 66 are sent into the multiplex signal processor 54.

Figure 9:
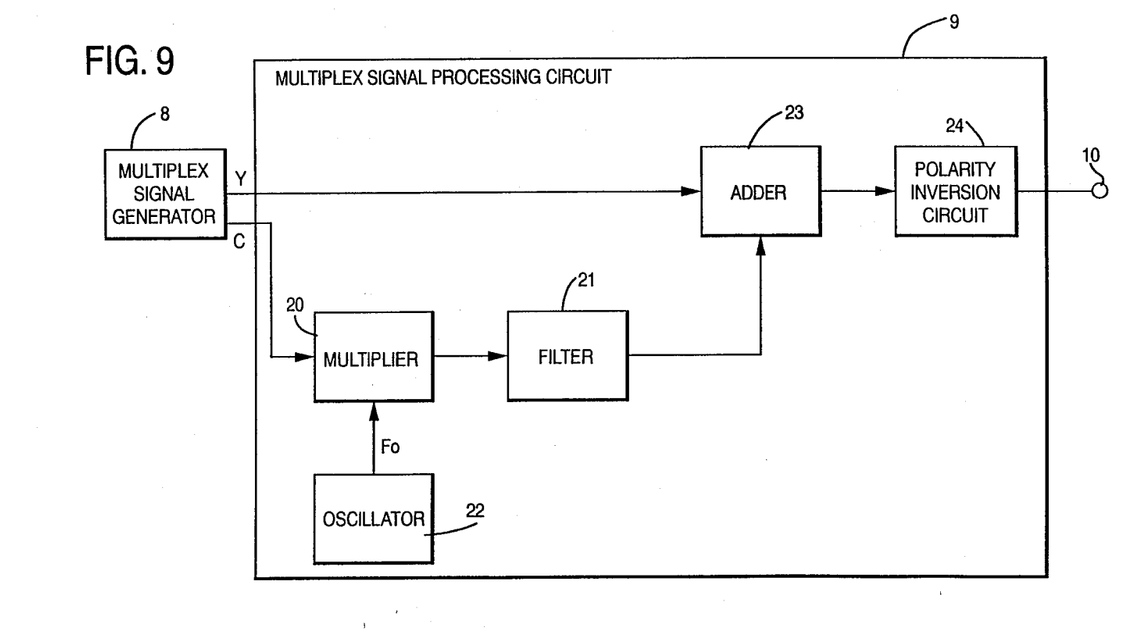
Figure 10:
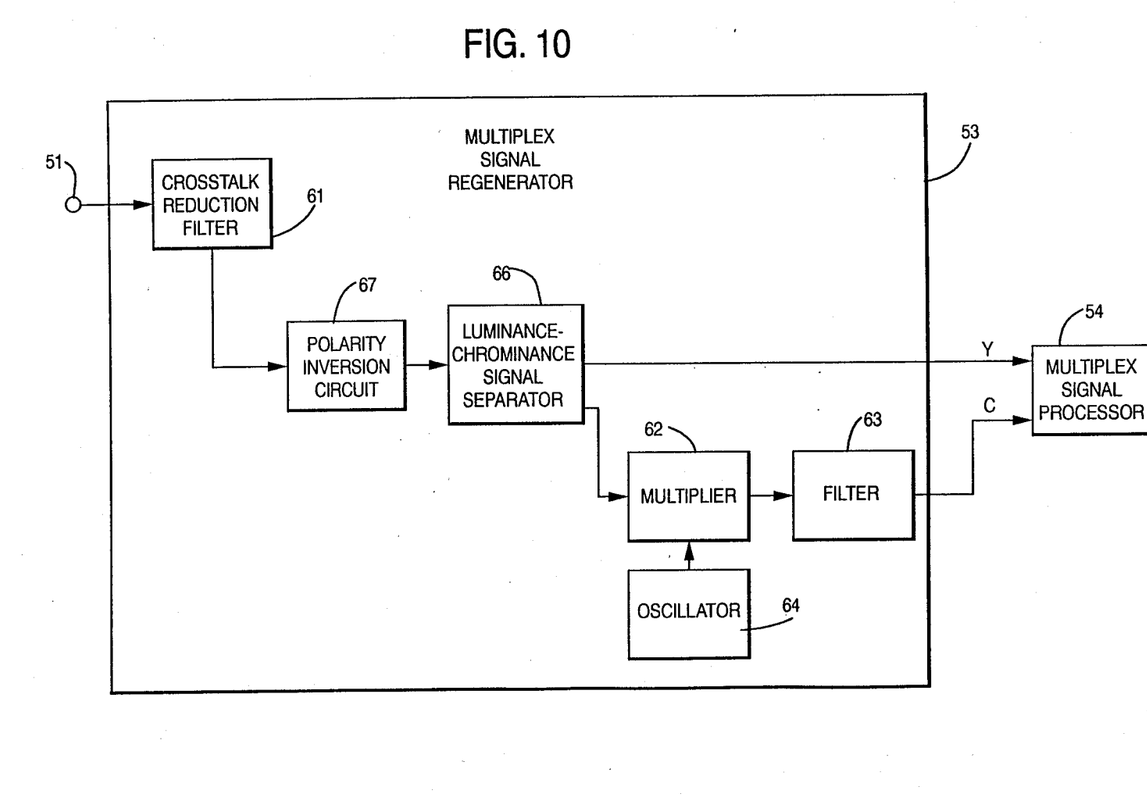

FIG. 9 is a block diagram showing, in detail, the multiplex signal processing circuit for inverting the frequency of only the chrominance signal C from among of the luminance signal Y and the chrominance signal C delivered from the multiplex signal generator on the transmission side shown in FIG. 1. FIG. 10 is a block diagram showing, in detail, the multiplex signal regenerator on the reception side corresponding to that in FIG. 9. The operation is the same as that in the configuration shown in FIG. 7 and FIG. 8 except that the frequency inversion processing is executed on the chrominance signal instead of the luminance signal.

When receiving the composite television signal generated by the method of the present invention by the conventional television receiver, the band is limited by the transmission side inverse nyquist filter and the reception side nyquist filter, so that the multiplex signal components form double side bands in which the higher frequency components are more attenuated in regard to the video carrier as shown in FIG. 13(b). As described above, the multiplex signal is inverted on the frequency axis so that the low frequency component with a stronger power should be in a higher frequency, the component with larger power is more suppressed with respect to its amplitude, and as a result the impairment of the conventional television receivers, not only those having detection circuits using synchronous detection but also those with detection circuits using pseudo-synchronous detection and furthermore those with detection circuits using envelope detection, is reduced in comparison with those not inverting their multiplex signals on the frequency axis.

In this embodiment, the multiplex signal is synchronously detected by the multiplex signal detector 48 after limiting the band by the filter 47, but it is also possible to synchronously detect the multiplex signal by the carrier $I_2$ and remove unnecessary frequencies by the filter. The band of multiplex signal is, meanwhile, not limited to 1.25 MHz as described herein. In addition, this invention is not limited to the television signal but it can be applied also to arbitrary vestigial side band amplitude-modulated signals.

What is claimed is:

1. A multiplex signal processing apparatus on a transmission side, comprising:
    a first carrier modulating means for modulating a first carrier by a main signal;
    a means for inverting at least one of frequency and polarity of a multiplex signal;
    a second carrier modulating means for modulating a second carrier, which is the same in frequency as and different in phase from the first carrier, by an output of said inverting means; and a means for adding an output of the first carrier modulating means and an output of the second carrier modulating means to obtain a signal to be transmitted.

2. A multiplex signal processing apparatus as set forth in claim 1, further comprising an inverse nyquist filter having nyquist characteristics for filtering the output from the second carrier modulating means to form a vestigial side band signal.

3. A multiplex signal processing apparatus on a reception side, comprising:

a first synchronous detection means for receiving a signal composed of a signal formed by modulating a first carrier by a main signal and a signal formed by modulating a second carrier, which is the same in frequency as and different in phase from the the first carrier, by a signal inverted with respect to at least one of frequency and polarity of a multiplex signal, and synchronously detecting in-phase components of the first carrier to obtain the main signal;

a second synchronous detection means for receiving the same signal as that received by the first synchronous detection means, and synchronously detecting in-phase components of the second carrier to obtain the multiplex signal;

a filter for removing cross-talk from the main signal from the output multiplex signal of the second synchronous detection means; and a means for inverting at least one of frequency and polarity of an output of said filter.

* * * * *